US008823648B2

(12) United States Patent
Godwin

(10) Patent No.: US 8,823,648 B2
(45) Date of Patent: *Sep. 2, 2014

(54) VIRTUAL INTERFACE AND CONTROL DEVICE

(71) Applicant: Chauncy Godwin, Altadena, CA (US)

(72) Inventor: Chauncy Godwin, Altadena, CA (US)

(73) Assignee: Chauncy Godwin, Altadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,244

(22) Filed: Jan. 21, 2013

(65) Prior Publication Data

US 2013/0222242 A1    Aug. 29, 2013

Related U.S. Application Data

(63) Continuation of application No. 13/174,357, filed on Jun. 30, 2011, now Pat. No. 8,358,283, which is a continuation of application No. 11/327,785, filed on Jan. 6, 2006, now abandoned.

(60) Provisional application No. 60/641,809, filed on Jan. 7, 2005.

(51) Int. Cl.
G06F 3/033 (2013.01)

(52) U.S. Cl.
USPC ............ 345/158; 345/156; 345/173; 345/174

(58) Field of Classification Search
USPC ................... 345/156–183; 178/18.01–20.04; 340/12.22; 715/716
See application file for complete search history.

(56) References Cited

U.S. PATENT DOCUMENTS

| 5,973,677 | A | * | 10/1999 | Gibbons | ........................ 345/179 |
| 6,243,054 | B1 | * | 6/2001 | DeLuca | ............................ 345/7 |
| 6,313,825 | B1 | | 11/2001 | Gilbert | |
| 6,498,628 | B2 | | 12/2002 | Iwamura | |
| 6,614,422 | B1 | | 9/2003 | Rafii et al. | |
| 6,690,357 | B1 | | 2/2004 | Dunton et al. | |
| 8,358,283 | B2 | * | 1/2013 | Godwin | ........................ 345/173 |
| 2002/0006807 | A1 | | 1/2002 | Mantyjarvi et al. | |
| 2002/0075240 | A1 | | 6/2002 | Lieberman et al. | |
| 2003/0048312 | A1 | | 3/2003 | Zimmerman et al. | |
| 2004/0041828 | A1 | * | 3/2004 | Zellhoefer | ..................... 345/706 |
| 2005/0276448 | A1 | * | 12/2005 | Pryor | ............................ 382/103 |

* cited by examiner

*Primary Examiner* — William Boddie
*Assistant Examiner* — Mansour M Said
(74) *Attorney, Agent, or Firm* — Knobbe, Martens, Olson & Bear, LLP

(57) ABSTRACT

An input device for a computer or other programmable device translates the proximity of an object to one or more antennae into an electronic signal. The antennae generate a first frequency and a second frequency. When an object, such as a hand, is placed in proximity to the antenna, the object causes the first and second frequencies to heterodyne, which creates a third frequency, also referred to as a beat frequency or pulse frequency. A receiver interprets the pulse frequency and translates it into an electronic signal that can be used to command a computer or other programmable device.

12 Claims, 3 Drawing Sheets

ANTENNA - 1          ANTENNA - 2

VIRTUAL INTERFACE AND CONTROL DEVICE

CROSS-REFERENCE TO RELATED APPLICATIONS

This application is a continuation U.S. patent application Ser. No. 13/174,357, filed on Jun. 30, 2011, which claims the benefit of U.S. patent application Ser. No. 11/327,785, filed on Jan. 6, 2006, which claims the benefit of U.S. Provisional Patent Application Ser. No. 60/641,809 filed Jan. 7, 2005. Each of the above-referenced patent applications are hereby incorporated by reference in their entirety.

BACKGROUND OF THE INVENTION

1. Field of the Invention

The present invention is related to methods and devices for interfacing with electronic devices that receive commands from an operator, such as computer systems.

2. Description of the Related Art

The following description and discussion of the prior art is undertaken in order to provide background information so that the present invention may be completely understood and appreciated in its proper context.

Input devices for use with a computer have transformed significantly over the last three decades. Generally speaking, punch cards gave way to terminals with keyboards; keyboards gave way to the mouse. The mouse has evolved from a unit housing a ball interacting with motion detectors, to a number of variants, some of which are as follows:

U.S. Pat. No. 6,313,825 to Gilbert discloses an input device for a computer that detects movement of an object, such as a finger, within a selected field of space. The input device is used to control movement of a cursor over a display device. The device includes directional transducers that receive reflections of EMF from an object in the field, and provides signals to an "interpreter." The interpreter detects movements by employing a clock which determines the time difference between the reflections received by the transducers, which it then reduces to a signal that controls the cursor.

U.S. Pat. No. 6,690,357 to Dunton discloses an input device that uses images of input devices, and scanning sensors that detect user interaction with those images. The scanning sensors include digital video cameras that capture the movement of a user's hands and convert the movement into input command signals. The scanning sensors may alternatively sense the projected light reflected from the user's hands, or may detect the combination of the reflected projected light and the user's hands.

U.S. Pat. No. 6,614,422 to Rafii, et al., discloses an input device that employs a three-dimensional sensor imaging to capture three-dimensional data as to the placement of a user's fingers on a substrate that either bears or displays a template similar to a keyboard or a keypad. The three-dimensional sensor transmits optically acquired data to a companion computer system that computes the velocity and location of the user's fingers, and converts that information into a command.

U.S. Pat. No. 6,498,628 to Iwamura discloses an electronic appliance remote controller that employs a camera as a motion-sensing interface. The camera captures video images of a users' hand, evaluates the moving speed and direction of the hand, and correspondingly moves a cursor appearing on a screen.

In U.S. Patent Application Publication 2003/0048312, Zimmerman discloses an apparatus for generating control signals for the manipulation of virtual objects in a computer system. The apparatus includes a glove worn on a hand that includes sensors for detecting the gestures of the hand, and hand position. The computer system receives data from the sensors, and generates corresponding control signals in response.

U.S. Patent Application Publication 2002/0075240, Lieberman, et al., describes a device for inputting alphanumeric information into a computer that employs sensors that may be optical, acoustic or position sensors to sense the "pressing" or "striking" of virtual keys. The sensor then forwards data to a processor, which converts the "pressing" or "striking" data with characters, instructions information or data.

U.S. Patent Application Publication 2002/0006807, Mantyjarvi, et al., teaches a device for entering data that creates a virtual keyboard by using an infrared transceiver arrangement. The infrared transceivers record reflection data obtained from an object placed within a field of infrared light, and processes the data to correspond to a key position or function.

SUMMARY

The invention comprises an input device for a computer or other programmable circuit that translates the proximity of an object to one or more antennae into an electronic signal. The antenna generates a reference first frequency and a second frequency.

DETAILED DESCRIPTION OF THE PREFERRED EMBODIMENT

In the following detailed description of the preferred embodiments, reference is made to the accompanying drawings, and in which are shown by way of illustration specific embodiments in which the invention may be practiced. It is to be understood that other embodiments may be utilized and structural changes may be made without departing from the scope of the present invention.

Figure 1:
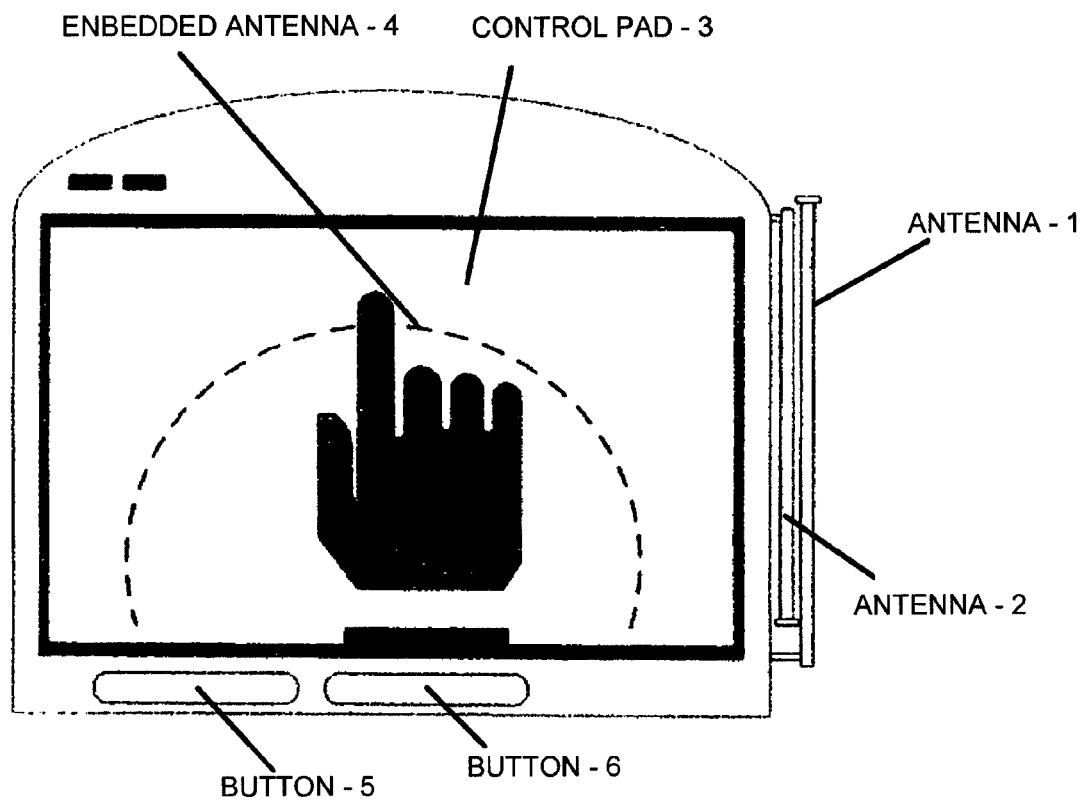
FIG. 1 is a perspective view of one embodiment of the intervention.

FIG. 1 shows a perspective view of preferred embodiment of the invention that may be used to operate a programmable device, such as a computer. A first antenna 1, and second antenna are 2 rotatably and pivotally attached to control pad 3. Control pad 3 may include a third antenna 4, which may be embedded in, or externally attached to control panel 3. Control pad 3 may also include buttons 5 and 6, which can correspond to the left and right buttons found on a conventional mouse.

Antennas 1 and 2 may be constructed from conventional materials known to those of ordinary skill in the art. Antennas 1 and 2 may be rotatably and pivotally attached to control pad 3 by a combination of actuators that position the antennae in optimal relationships based upon feedback from the system driver.

Control pad 3 may resemble a conventional mouse pad known to those in the art. Control pad 3 may be constructed from any non-conductive material that is electromagnetically invisible to signals emitted or received by the antennae. Antenna 4 may be formed from conventional materials, and can be embedded within control pad 3, or may be attached externally in a manner similar to antennae 1 and 2.

Figure 2:
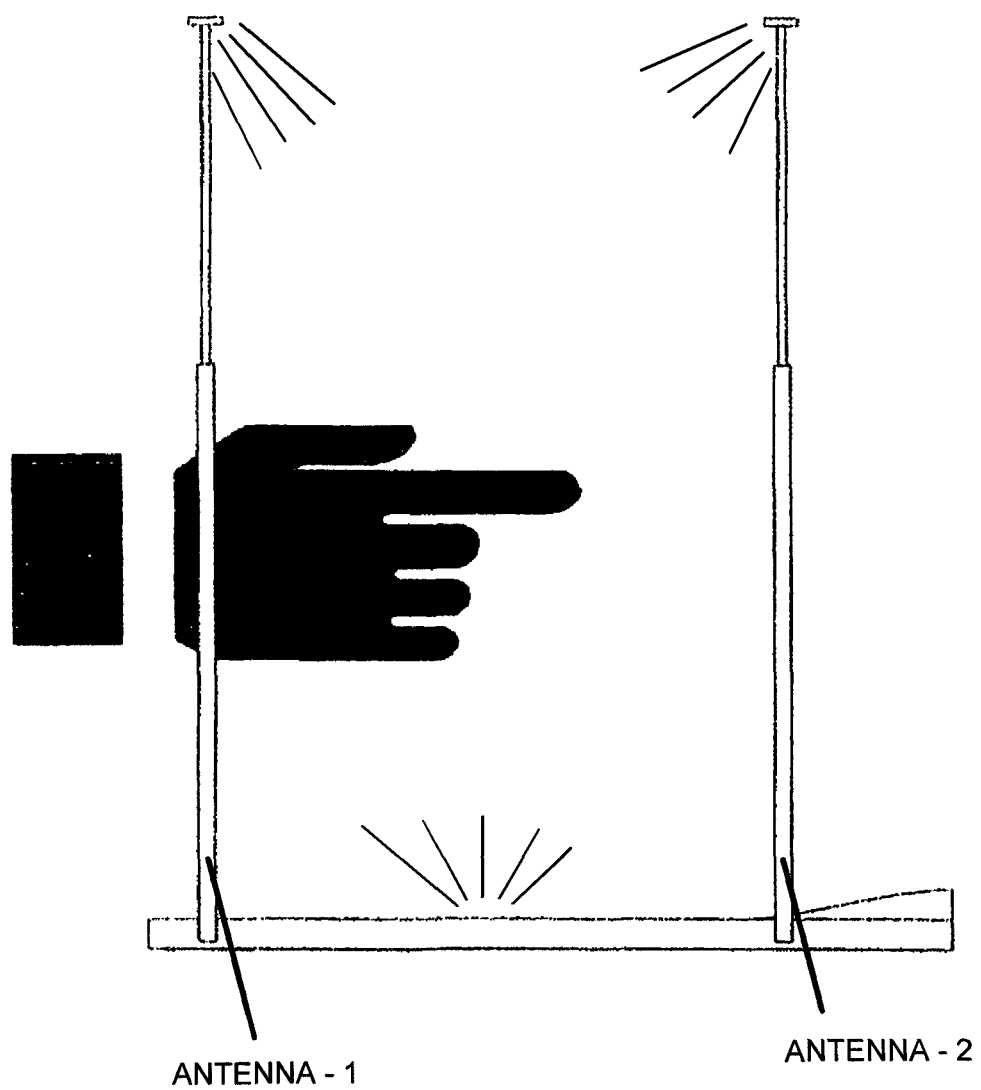
FIG. 2 is a side view of one embodiment of the intervention.

FIG. 2 depicts a side view where antennae 1 and 2 are in vertical positions relative to control pad 3, which is merely an example of how the antennae may be positioned. In practice, antennae 1 and 2 may be positioned in any positions relative to each other and control pad 3 to achieve optimal transmission and reception.

Figure 3:
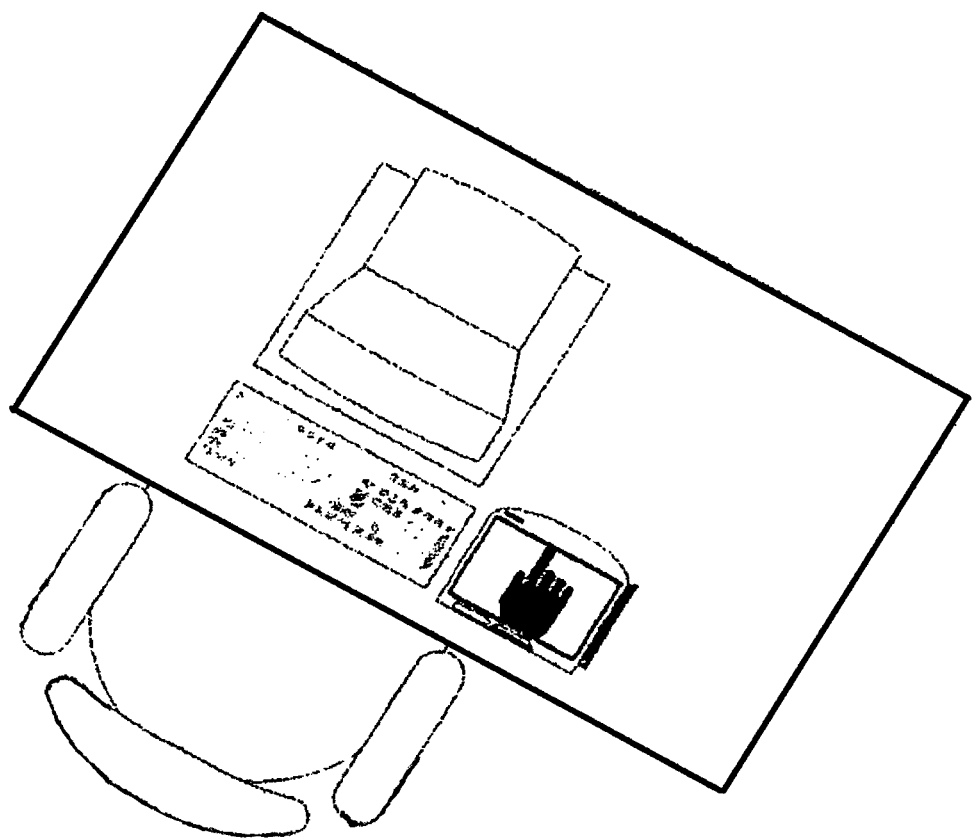
FIG. 3 is perspective view of a prefaced embodiment of the invention as used with a personal computer.

FIG. 3 presents a perspective view of the invention as applied to a conventional computer 7. While FIG. 3 depicts the invention being used with a personal computer ("PC"), it is important to note that the invention can be used with any size or type of computer or device that depends on input from a human operator. Examples include, but are not limited to, notebook computers, laptop computers, workstations, video game consoles, cash registers, automatic tellers, vehicle electronics or surgical/medical devices.

This invention may be used with one or more antennae. In operation, the antenna or antennae 1, 2 and 3 act as both emitters and receivers of electromagnetic fields. Generally, the antennae are operated in an electromagnetic spectrum range of 3 Hz to 1.24 eV. The antenna or antennae are arrayed in various arrangements depending upon the particular application, and the current frequency range being used. Each of the antennae initially emits a reference frequency. When an object, such as a hand, is placed in the field created by the antenna or antennae over control pad 3, the object creates a disturbance to the field. This disturbance is registered as a change in value. The value change is translated into a coordinate by a device driver or other software conventionally installed in the device to be controlled. As the object moves within the field, the change in coordinates may be expressed as a command to the device to be controlled, for example, the movement of a cursor on a computer screen. If desired, the invention can register more than one disturbance to the field at a given time, giving the ability to convey more complex commands to a device to be controlled than can be achieved through conventional means.

In an alternative embodiment, two or more interfaces will be linked with an imaging device that projects three-dimensional images. An example of such a three-dimensional imaging device is a holographic projector. The field emitted by the interfaces can overlay the projection. Through device drivers or other software programmed into a programmable circuit, attempts to interact with the images in the three-dimensional projection will be captured by the interface and will enable the user to move the virtual objects.

The invention will provide software specifically designed to relate two- and three-dimensional motion in two- and three-dimensional images as represented by a programmable circuit. This software can also interpret disturbances to the field for programmable circuits designed to control the motion of mechanical devices. The software may have a specific user interface that is modifiable for the user.

The invention may be linked electronically (wirelessly) or mechanically to the device to be controlled or object device, and can be powered by battery, a separate AC connection, by the object device, or any other conventional means known to those in the art. Two or more of these inventions may be connected to the device to be controlled so that a single user may use both hands simultaneously, or that multiple users can control the device. If used in conjunction with a computer as depicted in FIG. 3, buttons 5 and 6 may be used as on a conventional mouse, or alternatively, the optional third antenna 4 can be employed to interpret movement in three dimensions so that the invention can replicate the conventional functions of buttons 5 and 6 electronically, in a manner familiar to users of conventional mouse devices.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is intended that the invention be limited only by the claims and their equivalents.

What is claimed is:

1. A method for generating an electronic signal using an input device to command a computer or other programmable device, comprising:
   generating, by a first antenna, a first frequency;
   generating, by a second antenna, a second frequency;
   placing an object in proximity to the first antenna and the second antenna, the object causing the first and second frequencies to generate a pulse frequency without any physical contact between the object and input device;
   sensing, by a receiver, the pulse frequency;
   translating the pulse frequency into an electronic signal; and
   commanding the computer or other programmable device using the electronic signal, wherein the receiver is embedded in a touchpad, and wherein the first antenna and the second antenna are positioned on opposite ends of the control pad and the receiver is positioned between the two antennas.

2. The method of claim 1, wherein the object placed in proximity to the first antenna and the second antenna is a hand, and wherein the pulse frequency is generated without any physical contact between the hand and input device.

3. The method of claim 2, wherein placing the hand in proximity to the first and second antennae causes the two frequencies to heterodyne to generate the pulse frequency.

4. The method of claim 1, wherein the first and second antennae generate a third frequency configured to heterodyne with the first and second frequencies.

5. The method of claim 1, wherein the first antenna is attached to the control pad.

6. The method of claim 5, wherein the second antenna is attached to the control pad.

7. The method of claim 6, wherein the first antenna is attached to the control pad via servos and actuators such that it may be rotated and pivoted about the control pad.

8. The method of claim 7, wherein the first antenna is configured to automatically self-calibrate and position itself in the optimal position based on feedback input from the receiver.

9. The method of claim 1, wherein the programmable device comprises an imaging device, and wherein the imaging device is configured to project three-dimensional images.

10. The method of claim 9, wherein the imaging device is a holographic projector.

11. The method of claim 10, further comprising:
    projecting, by the holographic projector, a holographic image; and
    overlaying the projected holographic image with a field emitted by the first antenna, the second antenna, and the third antenna.

12. The method of claim 11, further comprising interacting with the holographic image using the field.

* * * * *